United States Patent [19]

Aquino et al.

[11] Patent Number: 5,431,551
[45] Date of Patent: Jul. 11, 1995

[54] ROTARY POSITIVE DISPLACEMENT DEVICE

[76] Inventors: Giovanni Aquino, 29 Byron Ave., Kenmore, N.Y. 14223; Ewan Choroszylow, 125 Church St., East Aurora, N.Y. 14052

[21] Appl. No.: 300,787

[22] Filed: Sep. 2, 1994

Related U.S. Application Data

[63] Continuation-in-part of Ser. No. 79,152, Jun. 17, 1993, abandoned.

[51] Int. Cl.⁶ ............................................. F01C 1/22
[52] U.S. Cl. ................................. 418/61.2; 418/179; 418/186
[58] Field of Search ............... 418/61.1, 61.2, 179, 418/186; 123/242

[56] References Cited

U.S. PATENT DOCUMENTS

| | | | |
|---|---|---|---|
| 3,485,220 | 12/1969 | Ferrarri. | |
| 3,655,303 | 4/1972 | Cotton | 418/61.2 |
| 3,877,848 | 4/1975 | Solem | 418/61.1 |
| 3,941,527 | 3/1976 | Acord | 418/61.2 |

Primary Examiner—Richard A. Bertsch
Assistant Examiner—Charles G. Freay
Attorney, Agent, or Firm—Howard J. Greenwald

[57] ABSTRACT

A rotary device containing a housing having a curved inner surface with a profile equidistant from an trochoidal curve, an eccentric mounted on a shaft disposed within the housing, a rotor mounted on the eccentric shaft which contains at least three intersecting faces and a partial bore located at the intersection of adjacent faces, and at least three rollers rotatably mounted within the partial bores of the rotor.

18 Claims, 15 Drawing Sheets

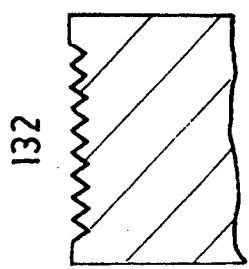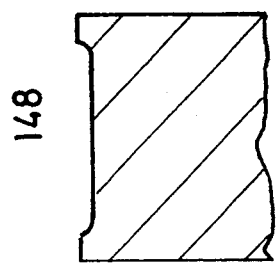
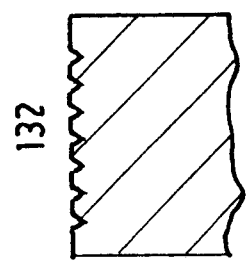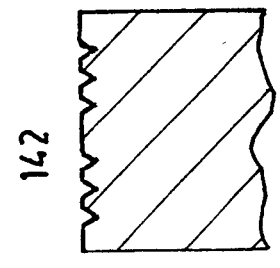
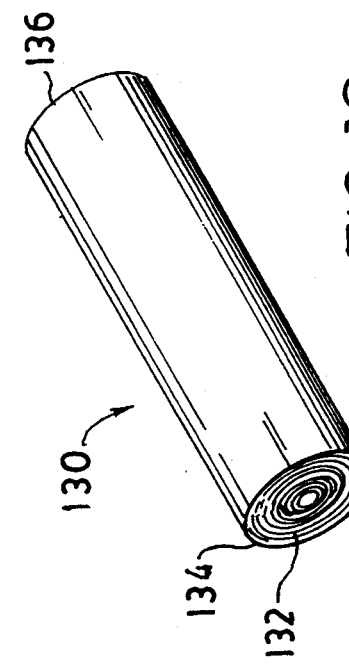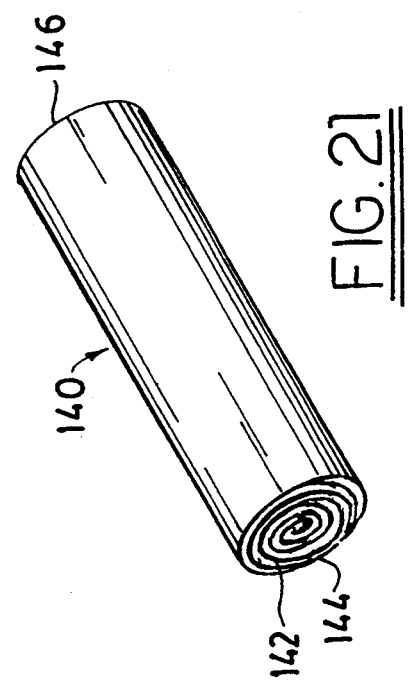

ROTARY POSITIVE DISPLACEMENT DEVICE

CROSS-REFERENCE TO RELATED APPLICATION

This application is a continuation-in-part of applicant's patent application Ser. No. 08/079,152, filed Jun. 17, 1993, now abandoned.

FIELD OF THE INVENTION

A trochoidal rotary chamber device, which can be used for compression and expansion of fluid, pumping of liquid, or as a hydraulic motor.

BACKGROUND OF THE INVENTION

Trochoidal rotary expansible chamber devices are well known to those skilled in the art. Thus, as is disclosed in U.S. Pat. No. 4,395,206 of Hoffman, these devices generally comprise a housing defining a cavity in which is mounted a rotor rotatable in a planetating fashion.

In the prior art rotary expansible chamber devices, the working chambers are generally sealed with radially extending apex seals positioned along intersection lines between adjoining peripheral faces on the envelope curve surface. A substantial problem with these rotary engine devices was discovered shortly after their introduction. Thus, as early as 1965, in, e.g., U.S. Pat. No. 3,213,801 of Venygr, it was disclosed that "Efficient operation of the afore-described apparatus is predicated on good sealing .connections between the sealing members and the inner casing wall, and between the sealing members and the rotor. The sealing members move circumferentially relative to the casing wall during operation of the engine, and they move relative to the rotor in a direction which has a predominant radial component as the several compartments are increased and decreased in radial size during relative movement of rotor and stator."

Venygr also disclosed that "It is difficult to maintain the necessary tight sealing engagement under the conditions of high temperature and high pressure differentials under which the sealing members frequently operate . . . , Seizing and wear reduce the useful life of conventional sealing members, and vibration of the members at resonant frequencies causes grooving of the internal casing walls. When the walls have to be made of case hardened steel or other material resistant to grooving, mass production of the engines becomes difficult."

The problems disclosed by Venygr in his 1965 patent, to the best of applicants' knowledge, have not yet been solved by any prior art device. Consequently, the Wankel engine/compressor, which once held such substantial commercial promise, now has only very limited commercial use.

It is an object of this invention to provide a rotary mechanism in which the incidence of seizing, wear, and grooving is substantially reduced.

It is yet another object of this invention to provide a rotary mechanism which is substantially more durable, and reliable than prior art rotary mechanisms.

It is yet another object of this invention to provide a rotary mechanism in which the incidence of vibration, impact, and chatter within the device is minimize.

SUMMARY OF THE INVENTION

In accordance with this invention, there is provided a rotary device comprised of a housing, a shaft disposed within said housing, a rotor mounted on said shaft, and a multiplicity of solid cylindrical rollers disposed on the inner surface of said housing and said rotor and rotatably mounted within an external surface of said rotor.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 18 is a perspective view of another preferred embodiment of a roller which may be used in the device of FIG. 1;

FIG. 19 is a sectional view of the end of the roller of FIG. 18;

FIG. 20 is a sectional view of the end of another roller which may be used in the device of FIG. 1;

FIG. 21 is a perspective view of another preferred embodiment of a roller which may be used in the device of FIG. 1;

FIG. 22 is a sectional view of the end of the roller of FIG. 21;

FIG. 23 is a sectional view of the end of another roller which may be used in the device of FIG. 1;

DESCRIPTION OF THE PREFERRED EMBODIMENTS

Rotary piston mechanisms of various types are well known and are disclosed, e.g., in U.S. Pat. Nos. 2,873,250 of Batten, 2,988,065 of Wankel et al., 2,866,417 of Nubling, 3,323,498 of Kraic et al, 3,671,154 of Kolbe et al., 3,797,974 of Huf, 3,923,430 of Huf, and the like.

Figure 1:
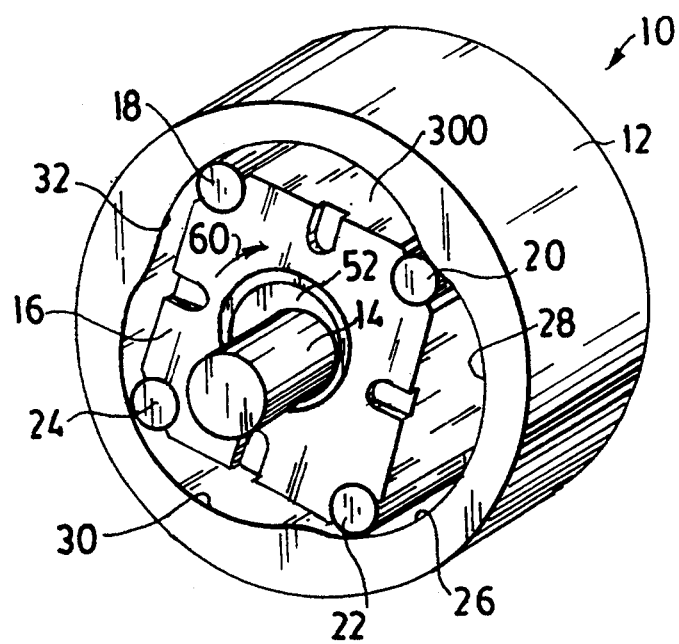
FIG. 1 is a perspective view of one preferred rotary mechanism of this invention.

FIG. 1 is a perspective view of one preferred rotary mechanism 10. Referring to FIG. 1, it will be seen that rotary mechanism 10 is comprised of housing 12, shaft 14, rotor 16, and solid rollers 18, 20, 22, and 24.

Referring again to FIG. 1, it will be seen that housing 12 is preferably an integral structure. However, as will be apparent to those skilled in the art, housing 12 may comprise two or more segments joined together by conventional means such as, e.g., bolts.

In one embodiment, housing 12 consists essentially of steel. As is known to those skilled in the art, steel is an alloy of iron and from about 0.02 to about 1.5 weight percent of carbon; it is made from molten pig iron by oxidizing out the excess carbon and other impurities. See, e.g., pages 23-14 to 23-56 (and especially page 23-54) of Robert H. Perry et al.'s "Chemical Engineers' Handbook," Fifth Edition (McGraw-Hill Book Company, N.Y. 1973). In this embodiment, it is especially preferred to use low carbon steel.

In another embodiment, housing 12 consists essentially of aluminum. In yet another embodiment, housing 12 consists essentially of bronze. In yet another embodiment, housing 12 consists essentially of plastic. These and other suitable materials are described in George S. Brady et al.'s "Materials Handbook," Thirteenth Edition (McGraw-Hill, Inc., N.Y. 1991).

One advantage of applicants' rotary mechanism 10 is that the housing need not be constructed of expensive alloys which are resistant to wear; and the inner surface of the housing need not be treated with one or more special coatings to minimize such wear. Thus, applicants' device is substantially less expensive to produce than prior art devices.

Housing 12 may be produced from steel stock (such as, e.g., C1040 steel stock) by conventional milling techniques. Thus, by way of illustration and not limitation, one may use a computer numerical controlled milling machine which is adapted to cut a housing 12 with the desired curved surface.

Referring again to FIG. 1, it will be seen that housing 12 is comprised of an inner surface 26.

Figure 2:
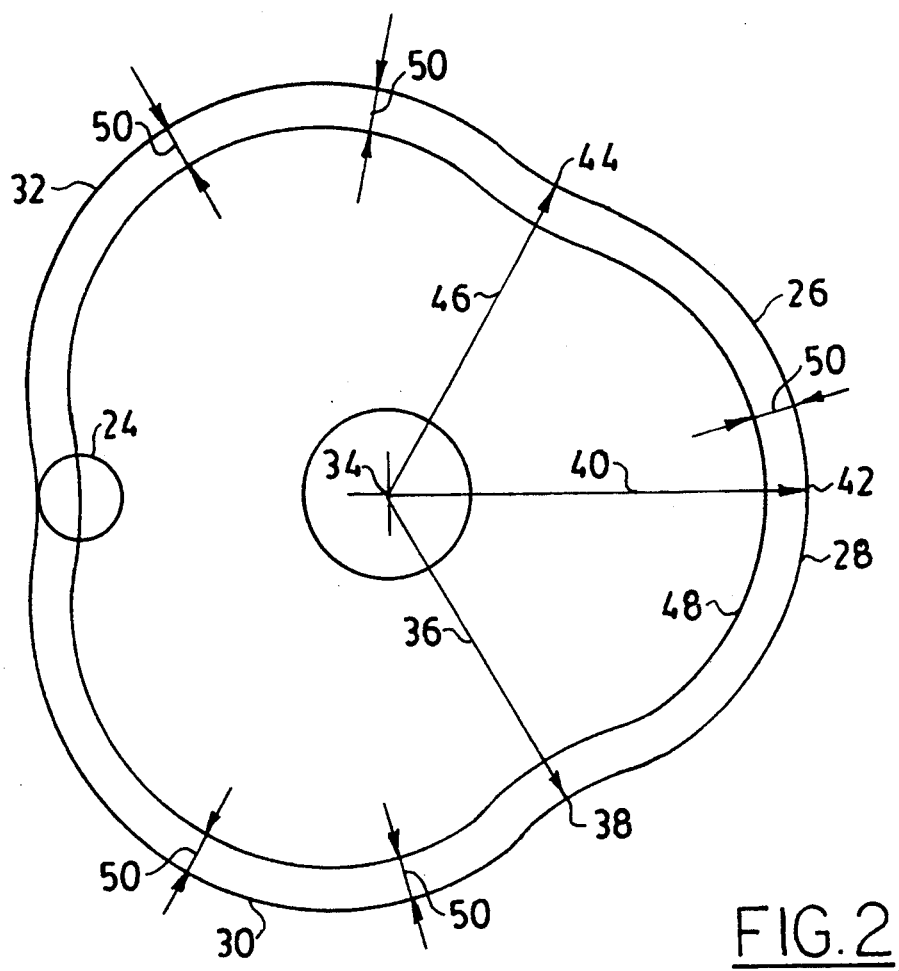
FIG. 2 is an axial, cross-sectional view of the mechanism of FIG. 1.

FIG. 2 is a view of inner surface 26. Referring to FIG. 2, and in the preferred embodiment illustrated therein, it will be seen that surface 26 defines a multiplicity of lobes 28, 30, and 32 which, in combination, define an inner surface 26 which has a continuously changing curvature.

Referring again to FIG. 2, it will be seen that, with regard to lobe 28, the distance from the centerpoint 34 to any one point on lobe 28 will preferably differ from the distance from the centerpoint 34 to an adjacent point on lobe 28; both the curvature and the distance from the centerpoint 34 is preferably continuously varying in this lobe (and the other lobes). Thus, for example, the distance 36 between point 34 and 38 is preferably substantially less than the distance 40 between points 34 and 42; as one progresses from point 38 to point 42 around surface 26, such distance preferably continuously increases as the curvature of lobe 28 continuously changes. Thereafter, as one progresses from point 42 to point 44, the distance 46 between point 34 and point 44 preferably continually decreases.

Referring again to FIG. 2, it will be apparent to those skilled in the art that, in this preferred embodiment, the same situation also applies with lobe: 30 and 32. Each of such lobes is preferably defined by a continuously changing curved surface; and the distance from the centerpoint 34 is preferably continuously changing between adjacent points.

In the preferred embodiment illustrated in FIG. 2, it is preferred to have at least two of such lobes. It is more preferred to have at least three of such lobes. In another embodiment, at least four of such lobes are present.

It is preferred that each lobe present in the inner surface 26 have substantially the same curvature and shape as each of the other lobes present in inner surface 26. Thus, referring to FIG. 2, lobes 28, 30, and 32 are displaced equidistantly around centerpoint 34 and have substantially the same curvature as each other.

The curved surface 26 may be generated by conventional machining procedures. Thus, as is disclosed in U.S. Pat. No. 4,395,206, the designations "epitrochoid" and "hypotrochoid" surfaces refer to the manner in which a trochoid machine's profile curves are generated; see, e.g., U.S. Pat. No. 3,117,561.

An epitrochoidal curve is formed by first selecting a base circle and a generating circle having a diameter greater than that of the base circle. The base circle is placed within the generating circle so that the generating circle is able to roll along the circumference of the base circle. The epitrochoidal curve is defined by the locus f points traced by the tip of radially extending generating or drawing arm, fixed to the generating circle having its inner end pinned to the generating circle center, as the generating circle is rolled about the circumference of the base circle (which is fixed).

Figure 29:
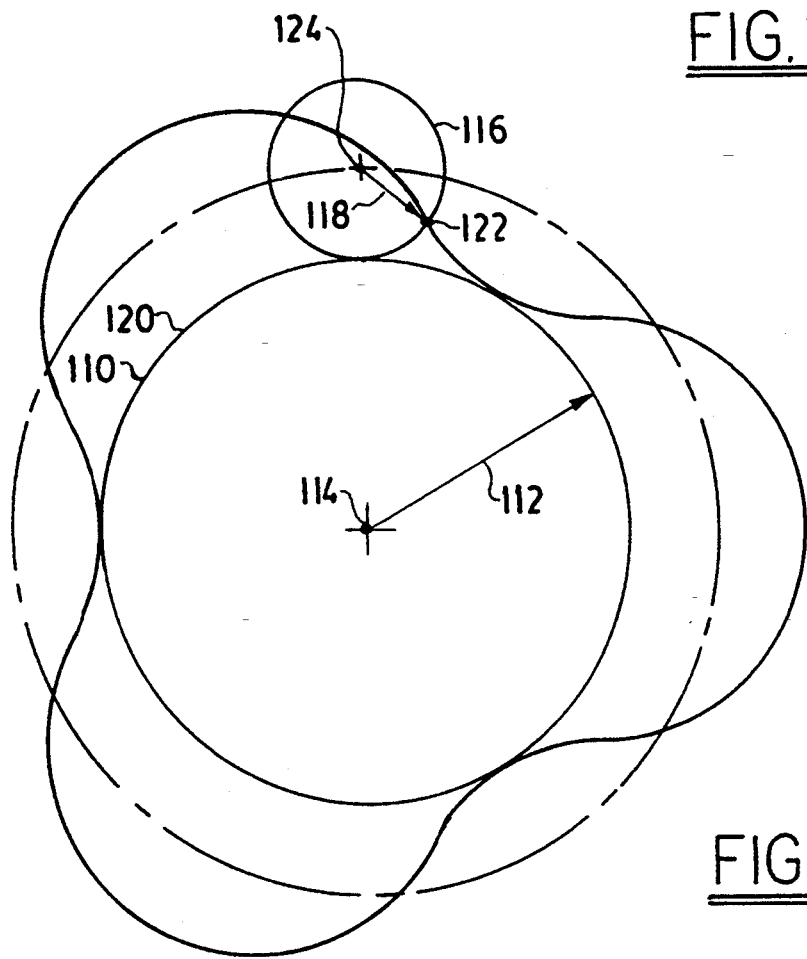
FIG. 29 is a schematic of a means for generating an epictroichoidal curve.

In one embodiment, the epitrochoidal curve is generated in accordance with the manner illustrated in FIG. 29. Referring to FIG. 29, it will be seen that base circle 110 with radius 112 extending from centerpoint 114 is maintained in a fixed position.

Referring again to FIG. 29, a smaller circle 116 with a radius 118 is caused to roll over the perimeter 120 of circle 110. Radius 118 is chosen so that the ratio between radius 112 and radius 118 is equal to an exact integer; thus, when the smaller circle 116 completes one journey around the base circle 110, it will have undergone an integral number of turns.

As smaller circle 116 is rolling aroung the perimeter 120 of base circle 112, any point chosen on the radius 118 of the smaller circle 116 (such as, for example, point 122) will, during the travel of such point, define an epitrochoidal curve.

Figure 4:
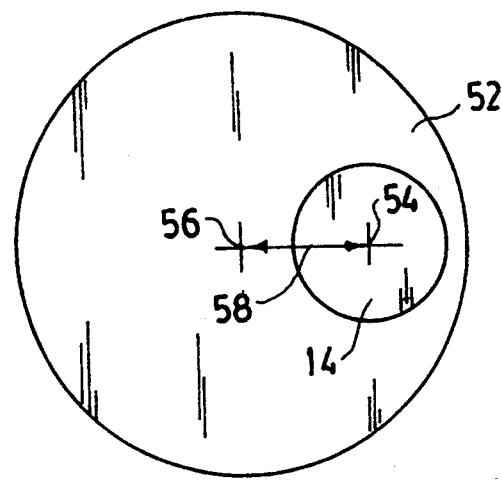
FIG. 4 is an axial, cross-sectional view of the eccentric crank of FIG. 3.

The distance between the centerpoint 124 of smaller circle 116 and point 122 is the eccentricity 58 (see Figure 4). Consequently, the point 122 should be chosen so that the desired eccentricity 58 is present.

Figure 5:
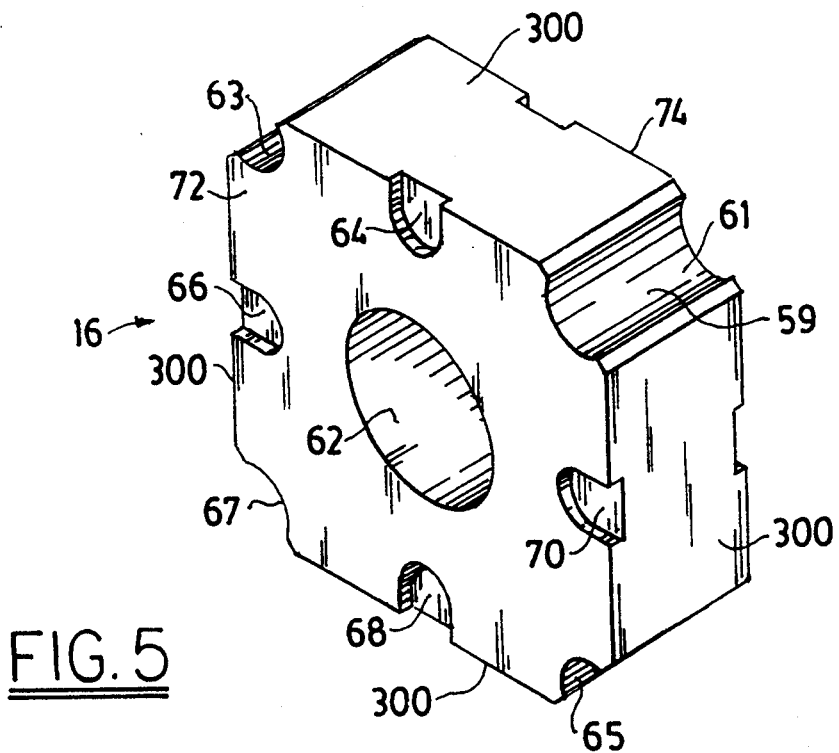
FIG. 5 is a perspective view of the rotor of the device of FIG. 1.

As is disclosed on lines 36 to 55 of column 5 of U.S. Pat. No. 4,395,206, it is common practice to recess or carve out the corresponding peripheral profile of the epitrochoid member a distance "x" equal to the outward offset of the apex seal radius (see FIG. 4 of such patent). As stated on lines 48 et seq., in "..., the case of an inner envelope type device 20', as shown in FIG. 4, such carving out requires that the actual peripheral wall surface profile 33 which defines the cavity 34 of the housing 35 be everywhere radially outwardly recessed from the ideal epitrochoid profile 36. In the case of an outer envelope device 21', as illustrated in FIG. 5, such carving out requires that the actual peripheral face profile of the epitrochoid working member, rotor 38, be everywhere inwardly radially recessed from the ideal epitrochoid profile 39."

Referring again to FIG. 2, it will be seen that applicants' inner housing surface profile 26 is generated from ideal epitrochoidal curve 48 and is outwardly recessed from ideal curve 48 by a uniform distance 50. In one preferred embodiment, uniform distance 50 is a function of the eccentricity of the eccentric 58 used in device 10 (see FIG. 4).

Referring again to FIG. 1, it will be seen that rotary mechanism 10 is comprised of shaft 14 on which eccentric 52 is mounted. This assembly is also shown in FIGS. 3, 4, and 4a.

Figure 3:
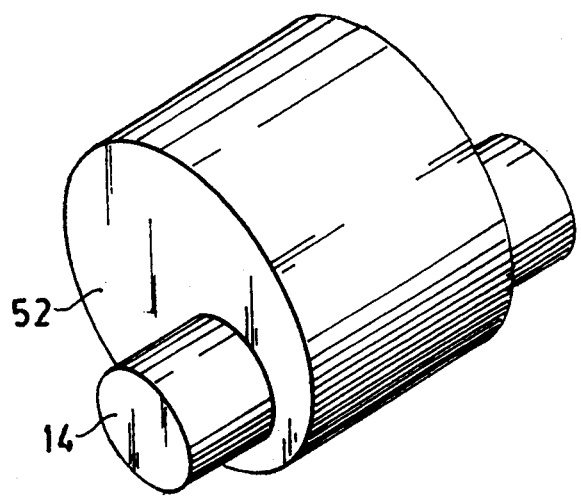
FIG. 3 is a perspective view of the eccentric crank of the mechanism of FIG. 1.
Figure 4A:
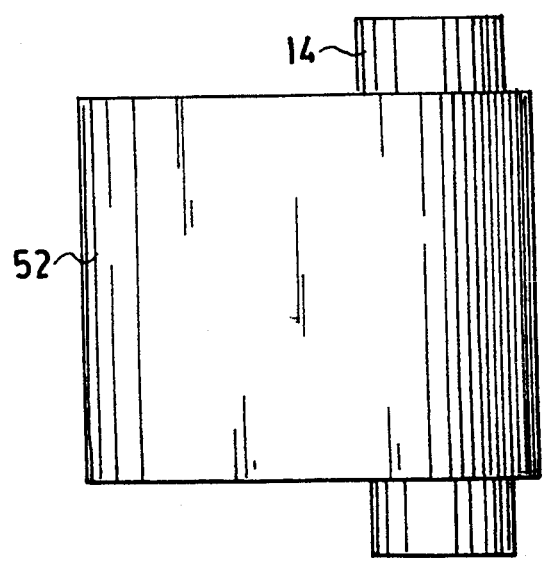
FIG. 4A is a transverse cross-sectional view of the eccentric crank of FIG. 3.

Referring to FIG. 3, it will be seen that shaft 14 preferably has circular cross-section and is cylindrical in shape. Shaft 14 is connected to eccentric 52. In one embodiment illustrated in FIG. 3, shaft 14 and eccentric 52 are integrally formed and connected.

In one preferred embodiment, both shaft 14 and eccentric 52 consist essentially of steel such as, e.g., carbon steel contains from about 0.4 to about 0.6 weight percent of carbon.

FIG. 4 is a front view of the shaft/eccentric assembly of FIG. 3. Referring to FIG. 4, it will be seen that shaft 14 has a geometric center 54, and eccentric 52 has ageometric center 56. The distance 58 between center 54 and center 56 is the eccentricity of the structure. As is known to those skilled in the art, eccentricity is the distance of the geometeric center of a revolving body (eccentric 52) from the axis of rotation (center 54 of shaft 14).

Referring again to FIG. 2, and in the preferred embodiment illustrated therein, it is preferred that the distance 50 be from about 0.5 to about 5.0 times as great as the eccentricity 58 (see FIG. 4). In a more preferred embodiment, the distance 50 is from about 1.0 to about 2.0 as great as eccentricity 58. In one embodiment, distance 50 is about 0 times as great as eccentricity 58.

Referring again to FIG. 2, in this preferred embodiment, the distance 50 is equal to the radius of solid roller 24. As will be apparent to those skilled in the art, and referring to FIG. 1, each of solid rollers 18, 20, 22, and 24 will preferably have a radius equal to distance 50.

Referring again to FIG. 1, rotor 16 is mounted on eccentric 52, which in turn is mounted on shaft 14. Shaft 14 is supported by an external means (not shown), such as an end housing (not shown) with a bearing system. Thus, because shaft 14 is supported by an external means, the rotor 16/roller 18 assembly need not be supported by the inner surface 26 of housing 12 during most of the rotation cycle.

Referring to FIG. 1, it will be seen that, when rotor 16 is in the position depicted, roller 22 is not necessarily contacting lobe 30, roller 20 is contacting lobe 28, and roller 24 is contacting lobe 32. As will be apparent to those skilled in the art, this situation changes when the rotor 16 rotates in the direction of arrow 60 and will be affected by, e.g., factors such as gravity, the distance between shaft 14 and the inner surface 26 at any point of rotation, and the like.

Figures 6, 7:
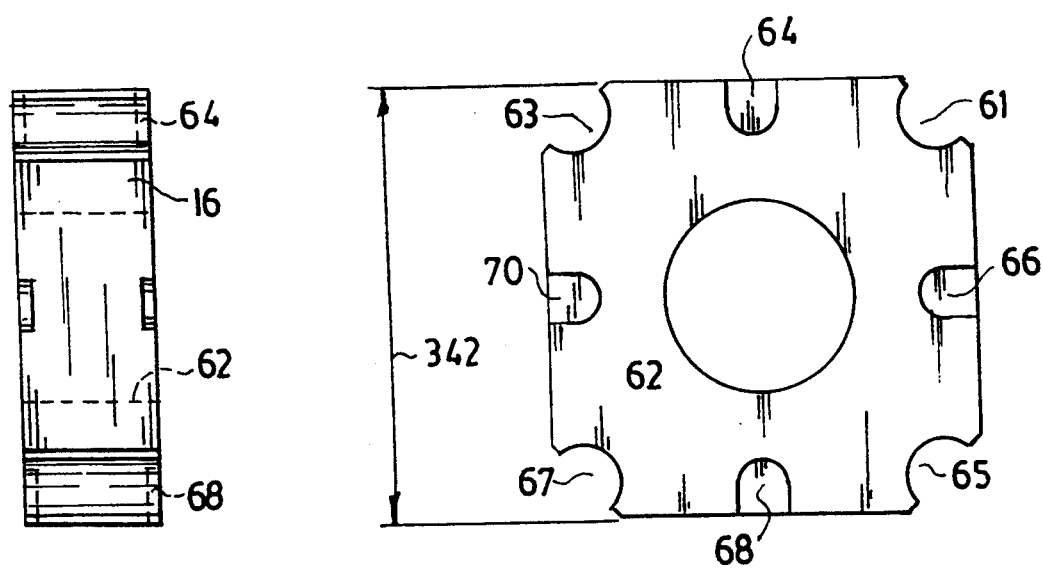
FIG. 6 is an axial, cross-sectional view of the rotor of FIG. 5.
FIG. 7 is a transverse, cross-sectional view of the rotor of FIG. 5.

One preferred embodiment of rotor 1,5 is illustrated in FIGS. 5, 6, and 7, in which a four-sided rotor is illustrated. Referring to FIG. 5, it will be seen that rotor 16 is preferably an integral structure which is comprised of an bore 62 centrally disposed within the body of rotor 16. Bore 62 is adapted to eccentric 52 (not shown in FIG. 5). In one embodiment, a bearing is preferably disposed between eccentric 52 and bore 62 (see FIG. 8, and refer to bearing 64).

Referring again to FIG. 5, it will be seen that rotor 16 has a number of sides equal to the number of lobes within housing 12 plus one; and the sides of the rotor 16 are disposed equally. Thus, for example, when housing 12 contains two such lobes, rotor 16 will be substantially in the shape of an equilateral triangle. When housing 12 contains three such lobes, rotor 16 will be substantially in the shape of a square. When housing 12 contains four such lobes, rotor 16 will be substantially in the shape of pentagon.

At the intersection of each of the sides of rotor 16, a partial bore is provided to receive a roller (not shown) and to capture it in the radial direction; see, for example, partial bores 61, 63, 65, and 67. The roller: (not shown) may be loosely disposed within such partial bores (see FIG. 1) and are removable in the axial direction.

Referring again to FIG. 2, the bore in which roller 24 is disposed is not shown for the sake of simplicity and illustration. However, it will be apparent to those skilled in the art, that the center of the partial bore in which roller 24 is disposed, as such center rotates around points 54 and 56 (as is shown in FIG. 4), will move along the ideal epitrochoidal curve.

Referring again to FIG. 5, recesses 64, 66, 68, and 70 are provided in side 72 of rotor 16; and these recesses are adapted to communicate with ports {2not shown) through which gas or fluid may be introduced and exhausted. In one embodiment (not shown), such ports exist on both sides of the housing 12; and, in such case, it is preferred to have similar recesses on both sides of rotor 16. In another embodiment, not shown, such ports exist on one side of housing 12 and such recesses exist on one side or on both sides of rotor 16.

In the embodiment illustrated in FIG. 5, each of recesses 64, 66, 68, and 70 is formed between and communicates between the front face 72 of rotor 16 and one of sides 300 of such rotor. Although such detail has been omitted for the sake of simplicity in FIG. 5, similar recesses are preferably formed between and communicate with the back face 74 of rotor. 16 and one of sides 300. As will be discussed later in this specification, each of such recesses are preferably disposed symmetrically and equidistantly between the ends of sides 300.

In one preferred embodiment, illustrated in the Figures, each of such recesses has a substantially U-shaped cross-sectional shape defined by a first linear side, a second linear side, and an arcuate section joining said first linear side and said second linear side. In this embodiment the first linear side and the second linear side are disposed with respect to each other at an angle of less than ninety degrees, and the substantially U-shaped cross sectional shape has a depth which is at least equal to its width.

In one embodiment, not shown, one or more of recesses 64, 66, 68, and 70 extend from side 72 of rotor 16 to the opposite side 74 of rotor 16.

Figure 8:
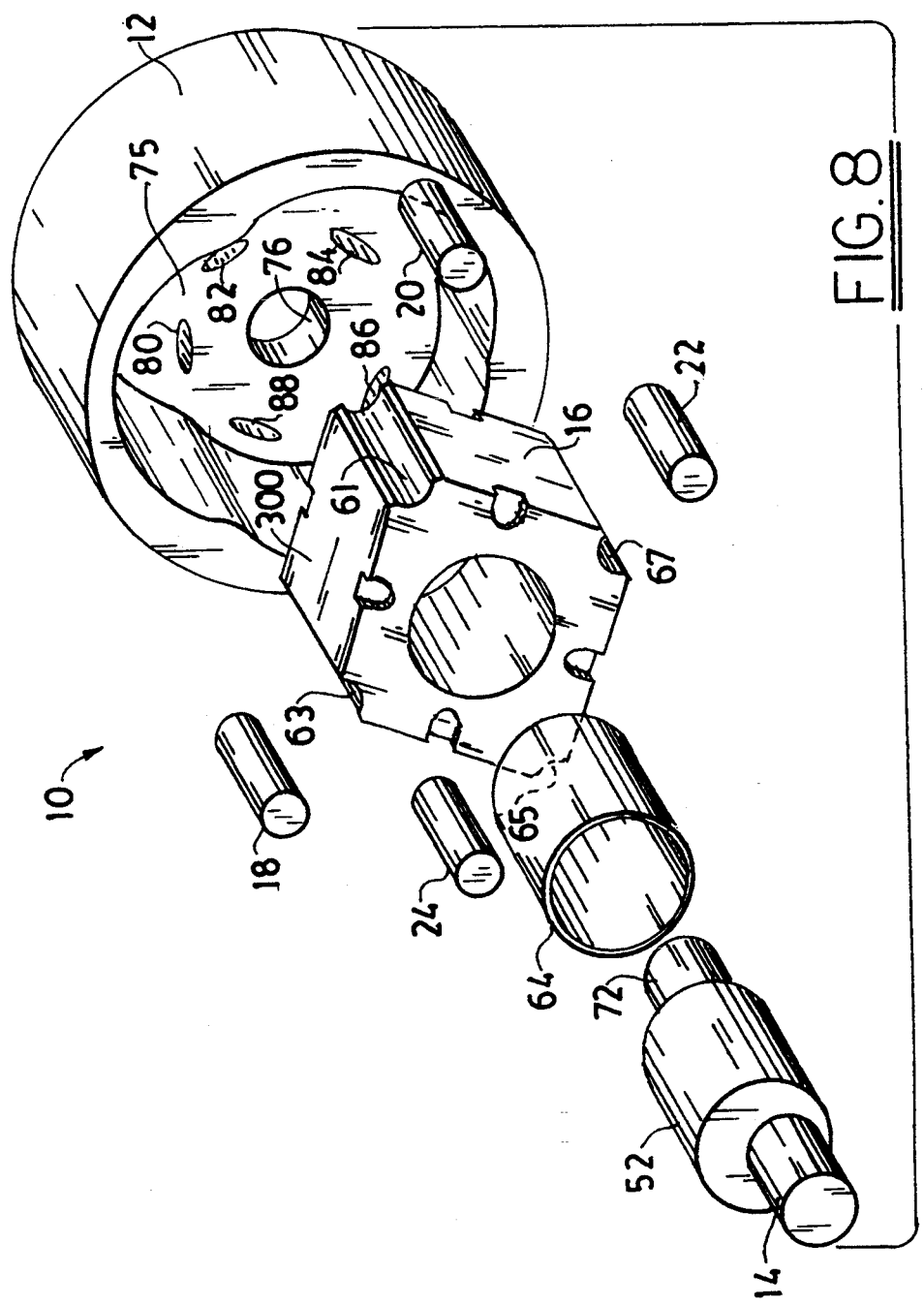
FIG. 8 is an exploded, perspective view of the device of FIG. 1.

FIG. 8 is an exploded perspective view of the rotary device 10 of FIG. 1. Referring to FIG. 8, it will be seen that the rotary device 10 is preferably comprised of a back wall 75 and a corresponding front wall (not shown in FIG. 8). In the preferred embodiment illustrated in this Figure, it will be seen that back wall 75 (and the corresponding front wall) is comprised of a bore 76 which is adapted to receive end 78 of shaft 14. It will also be seen that back wall 75, in this embodiment, is comprised of ports 80, 82, 84, 86, and 88 through which liquid and/or gas may be introduced to or expelled from. As will be apparent by reference to FIGS. 12 through 17, such gas and/or liquid is preferably introduced to one side of rotor 16, between a lobe of housing 12 and a side of rotor 16.

Referring again to FIG. 8, it will be seen that solid rollers 18, 20, 22, and 24 are disposed in partial bores 63, 61, 67, and 65, respectively. A preferred embodiment of these rollers is illustrated in FIGS. 9, 10, and 11.

Figure 9:
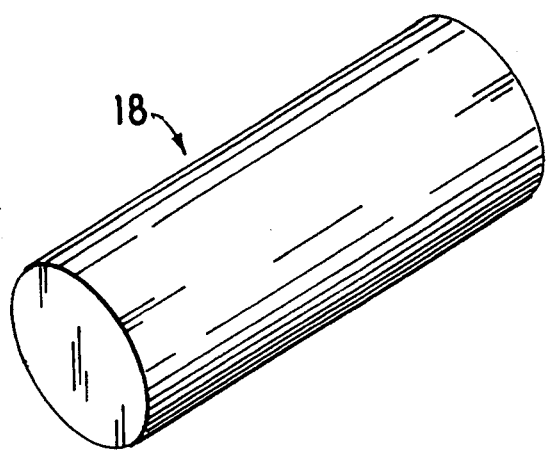
FIG. 9 is a perspective view of one of the rollers of the device of FIG. 1.
Figure 10:
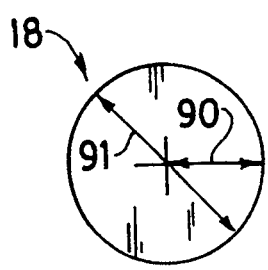
FIG. 10 is an axial, cross-sectional view of the roller of FIG. 9.
Figure 11:
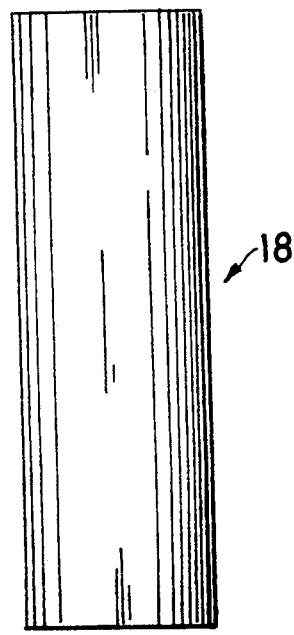
FIG. 11 is transverse, cross-sectional view of the roller of FIG. 9.

Referring to FIGS. 9, 10, and 211, it will be seen that roller 18 is preferably a solid cylindrical structure. Each of the rollers 18, 20, 22, and 24 have a radius 90 which is substantially equal to the radius of each of the other of such rollers and, preferably, is also equal to distance 50 (see FIG. 2).

Referring again to FIG. 9, 10, and 11, solid rollers 18 et seq. may comprise or consist essentially of any suitable material which will be dimensionally stable at the working temperature, have good impact resistance, have good wear resistance, and be substantially dimensionally stable in the working environment. By way of illustration and not limitation, one may use a metal material, a ceramic material, a plastic material, a reinforced plastic matrerial, and a composite material.

In one preferred embodiment, the material making up rollers 18 differs from the material making up the bearing surfaces of the partial recesses of rotor 16. In particular, the material making up the bearing surface 59 of partial recesses 61 et seq. (see FIG. 5) preferably differs from the material making up the solid roller 18.

In one preferred embodiment, solid[rollers 18 et seq. each consist essentially of bronze, and rotor 16 consists essentially of aluminum. In another embodiment, the solid rollers are made out of bronze, and the rotor is made out of steel.

In one embodiment, each of the rollers 18, 20, 22, and 24 consists essentially of a fiber-reinforced non-metallic material. In one aspect of this embodiment, the fiber used is an aramid. As is known to those skilled in the art, "aramid" is the generic name for a class of highly aromatic polyamide fibers derived from p-phenylenediamine and terephthaloyl chloride. In this aspect, short lengths of such aramid fiber are preferably randomly disposed within a matrix of an epoxy resin. This fiber reinforced material is commercially available and may be obtained under the tradename "HYDLAR."

The rollers 18, 20, 22, and 24 are, disposed within partial bores 61, 63, 65, and 67 and should be free to rotate therein. Thus, each of such partial bores may be so configured that there is clearance between the roller and the bore and thus the roller is free to rotate. As will be apparent to those skilled in the art, the configurations of such partial bores will preferably be designed so that, even under the conditions of use, which might involve elevated temperature, there will be a sufficient clearance between the rollers and the bores to allow freedom of rotation.

Referring again to FIG. 8, it will be seen that rotor 16 is shown with a substantially rectilinear shape and partial bores provided at the apices of such shape. In the preferred embodiment illustrated in FIG. 8, the sides of rotor 16 are slightly beveled near each of partial bores 61, 63, 65, and 67 to minimize the opportunity for such sides to contact any portion of the inner surface 26 of housing 12.

Figure 12:
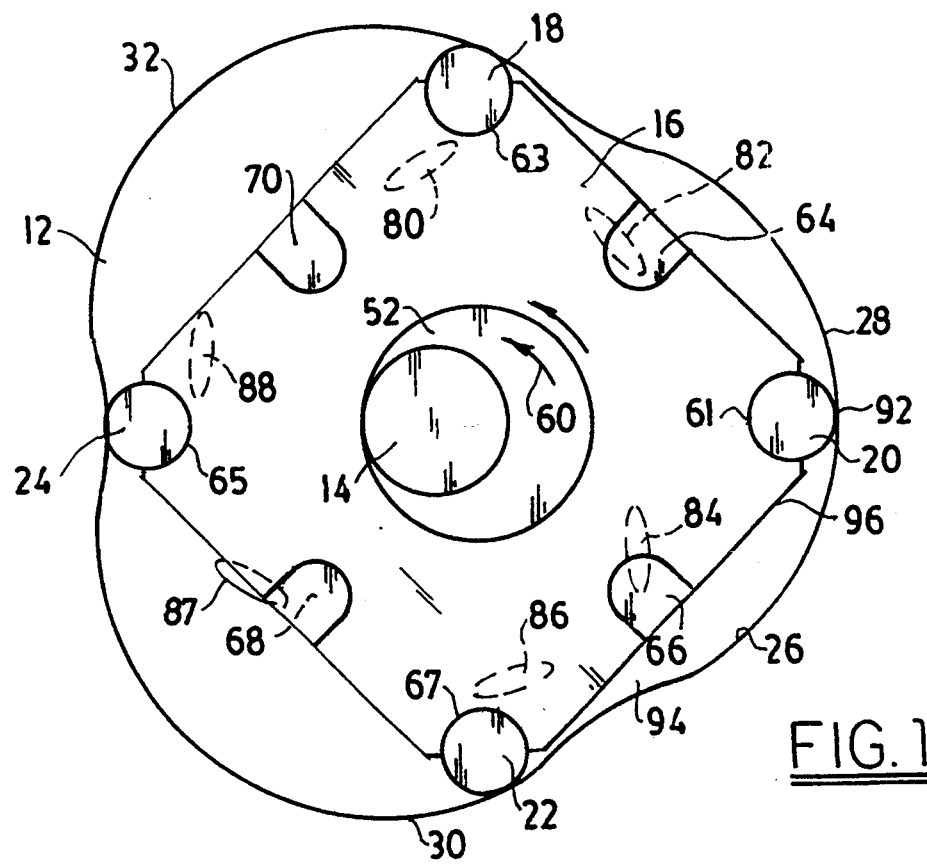
FIGS. 12 through 17 are are each axial sectional views of the device of FIG. 1, showing the rotor disposed within the housing of such device at various times during a partial cycle cycle.

FIG. 12 is a partial sectional view of the rotor assembly 10 of FIG. 1, illustrating the relative positons of rotor 16 and housing 12 at zero degrees of operation. In this position, it will be seen that, when roller 20 is at "zero point" 92, port 84 communicates with recess 66, but port 80 does not communicate with any such recess. Thus, in this position, gas and/or fluid may be introduced from port 84, into recess 66, and then flow into space 94 which exists between wall 96 of rotor 16 and inner wall 26 of housing 12. The gas or fluid so introduced into volume 94 will be compressed once port 84 ceases communicating with recess 66 and as shaft 14 continues to rotate in the direction of arrow 60.

Figure 13:
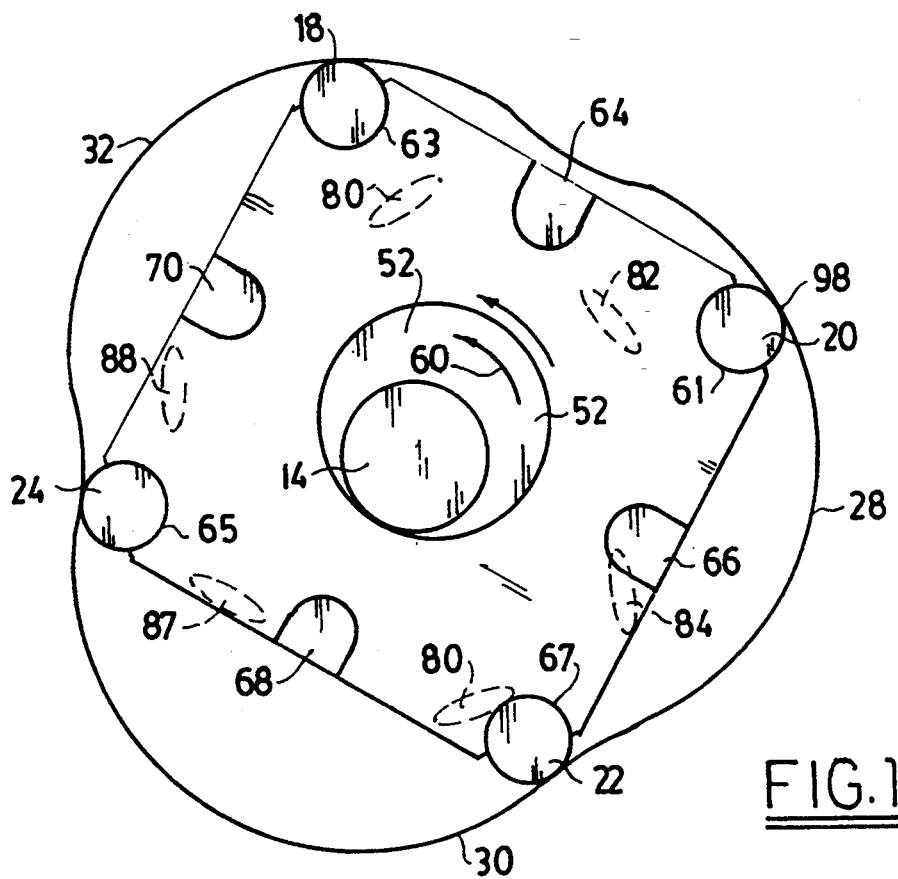

As the shaft 14 continues to rotate in the direction of arrow 60, it will bring the rotor 16 to the position depicted in FIG. 13.

Referring to FIG. 13, it will now be seen that roller 20 has advanced to point 98 due to an approximately 60 degree rotation of shaft 14. It will be seen that, in this position, port 84 still communicates with recess 66. However, it should also be noted that the volume 94 between wall 96 and lobe surface 28 is greater than the comparable volume 94 of the position depicted in FIG. 12. Thus, this larger volume 94 allow the introduction of more gas or fluid through port 84.

Figure 14:
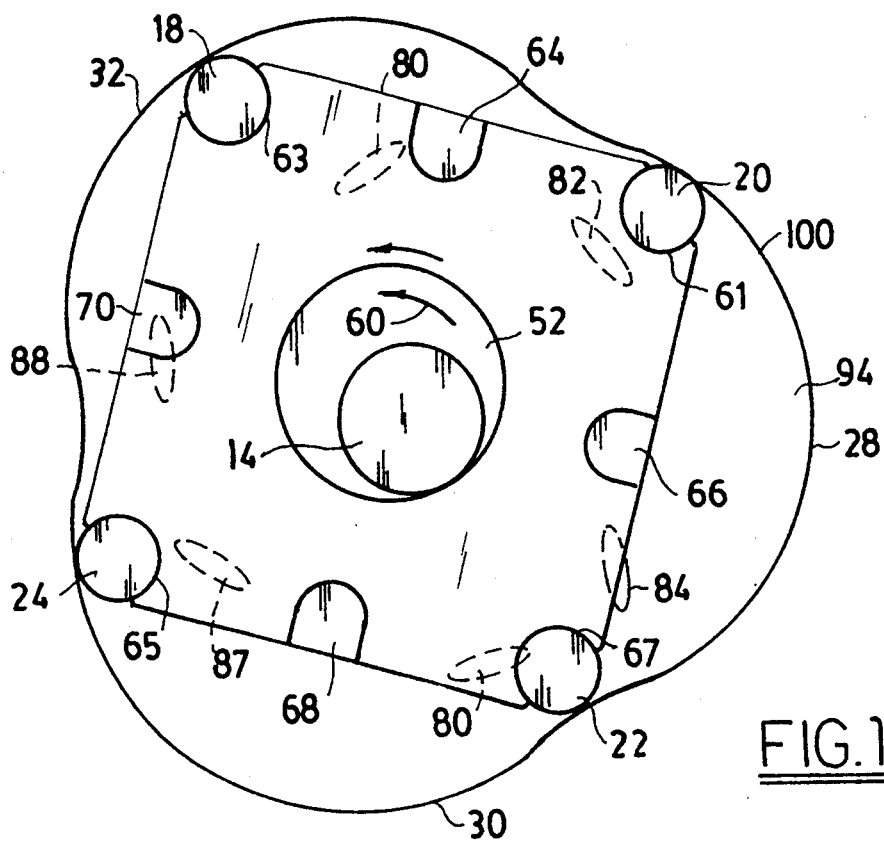

Referring to FIG. 14, it will now be seen that roller 20 has advanced to point 100 due to the rotation of shaft 14 an additional 60 degrees in the direction of arrow 60. It will be seen that, in this embodiment, the port 84 is no longer communicating with recess 66 but that, in part, it is communicating with space 94. In this position, the volume 94 is yet even larger than the volume 94 of the position of FIG. 13; and, thus, more fluid and/or gas may be introduced into the space 94. It will noted that, in the positions depicted in FIGS. 12, 13, and 14, volume 94 communicates only with port 84.

Figure 15:
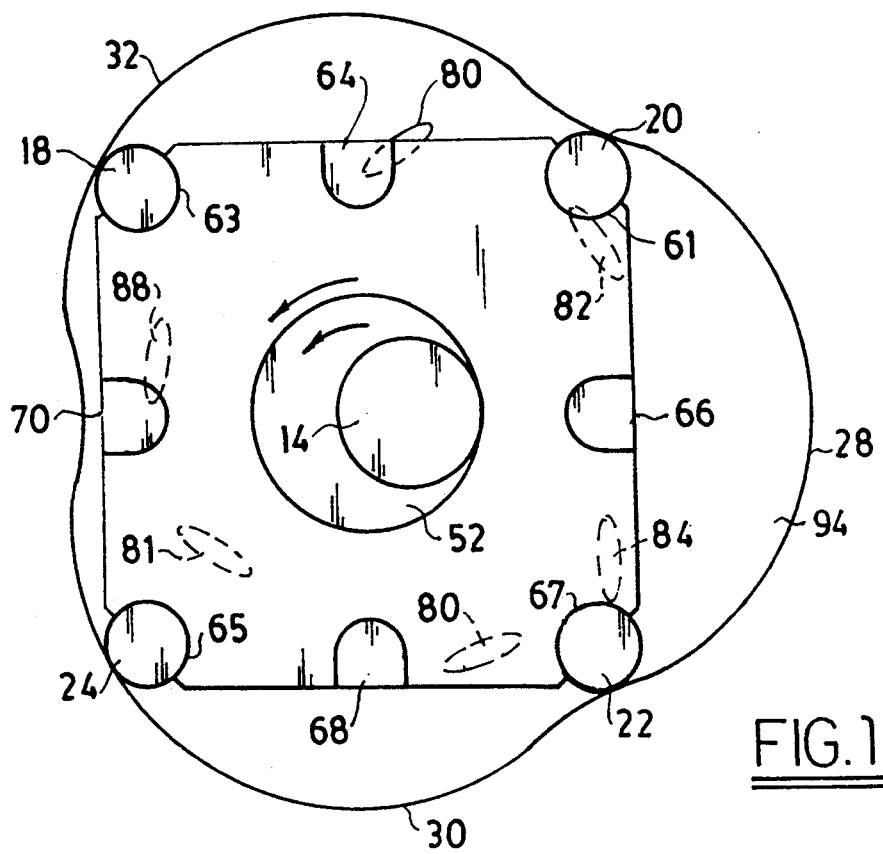

Referring to FIG. 15, which is the position obtained when shaft 14 rotates yet another 60 degrees, it will be seen that, in this position, port 84 no longer communicates with volume 94. In this position, there is no port in communication with the space 94. However, it also should be noted that the volume of space 94 in this position is greater than the comparable volumes of space 94 in the positions depicted in FIGS. 12, 13, and 14.

Figure 16:
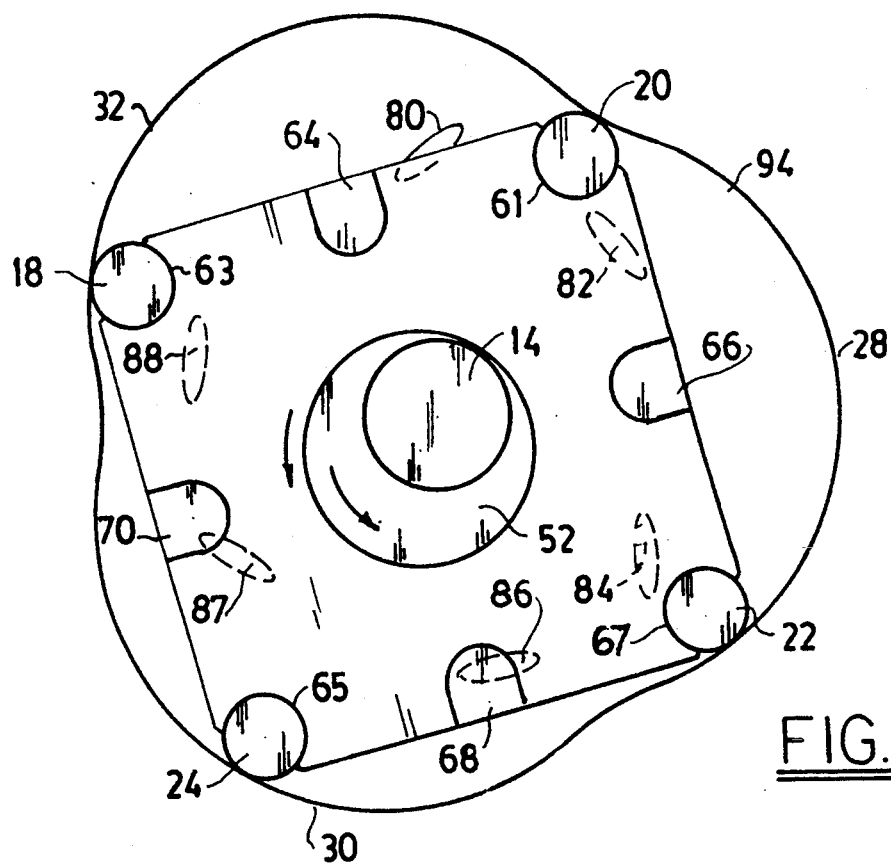

FIG. 16 is the position obtained when shaft 14 rotates another 60 degrees. In this position, neither port 82 nor port 84 is communicating with space 94. However, the volume of space 94 is smaller than the volume of the comparable space 94 of the position of FIG. 15; and, thus, the gas within such space is being compressed.

Figure 17:
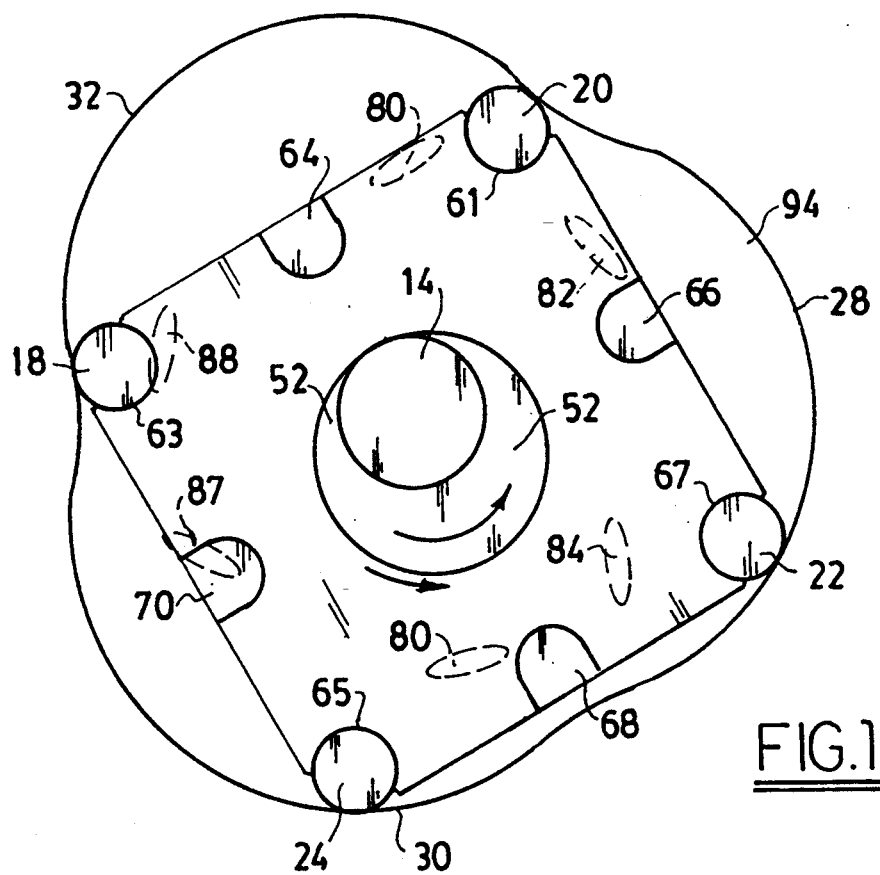

FIG. 17 is the position obtained when shaft 14 rotates yet another 60 degrees. It will be seen that, in this position, neither port 82 nor port 84 communicates with space 94. Furthermore, the volume of space 94 is still further reduced, thereby further compressing the gas and/or fluid within such space.

FIG. 18 is a perspective view of a roller 130 which may be used in rotor 16. Referring to FIG. 18, it will be seen that roller 130 is comprised of concentric grooves 132 at either proximal end 134 and/or distal end 136 (grooves not shown). As will be apparent to those skilled in the art, these concentric, circular grooves 132 improve the sealing between the rotor 16 and the sidewalls of the housing.

FIG. 19 is a sectional view of the end 134 of the roller 130, illustrating one configuration of the grooves 132. FIG. 20 illustrates another possible configuration for grooves 132.

FIG. 21 is a perspective view of another roller 140 which, in this embodiment, is comprised of phonographic (spiral) grooves 142. As will be apparent to those skilled in the art, such spiral grooves 142 may exist at proximal end 144 and/or distal end 146 (grooves not shown).

FIG. 22 is a sectional view of end 44 illustrating one configuration of spiral grooves 142. FIG. 23 illustrates another possible configuration for either end 144 and/or 146, in which a center relief portion 148 is machined into the end of the roller.

Figure 24:
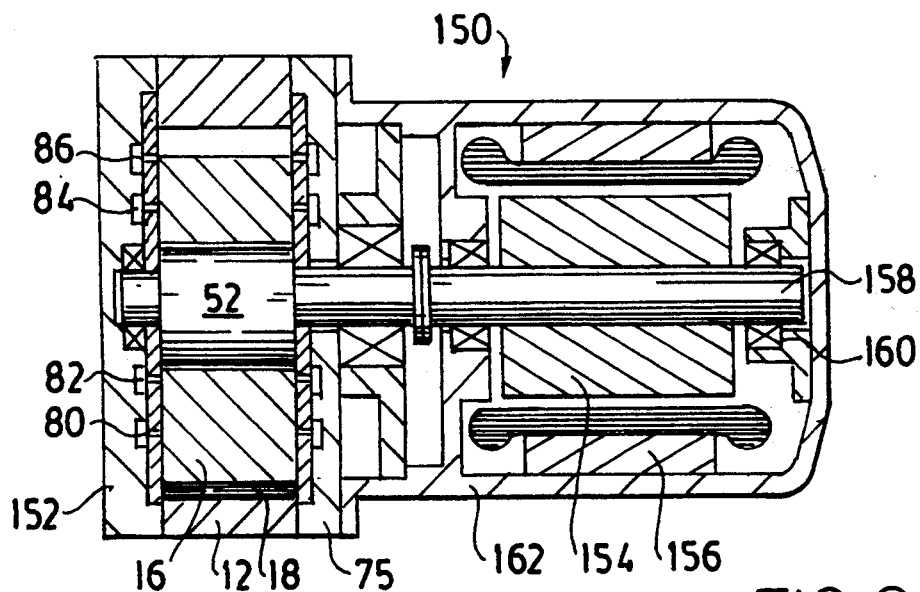
FIG. 24 is a cross-sectional of a guided rotor mechanism close-coupled in a hermetic fashion to an electric motor.

FIG. 24 is a sectional view of a hermetic compressor/electric motor system 150 which is comprised of housing 12 and end plate 152 in which ports 80, 82, 84, and 86 are located. The assembly 150 is comprised of a driving member which itself comprises a rotor 154, a stator assembly 156, a shaft 158, bearings 160, and a housing 162 which, in one preferred embodiment, is a hermetic enclosure with a compressor.

Figure 25:
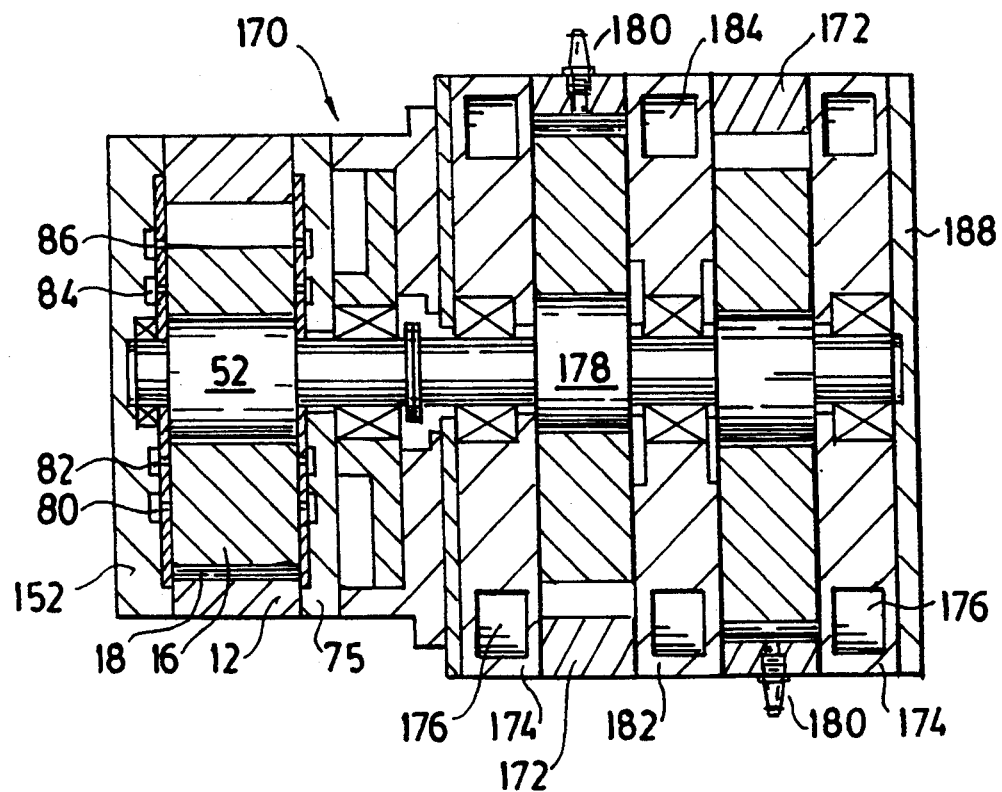
FIG. 25 is a cross-sectional view of a guided rotor mechanism close-coupled to a combustion engine of a reciprocating or guided rotor type.

FIG. 25 is a sectional view of a compressor/internal combustion engine system 170. The combustion engine system may comprise a reciprocating engine and/or a Wankel rotary engine; alternatively, it may comprise the guided rotor mechanism utilized as a combustion engine. Referring to FIG. 25, it will be seen that the preferred device illustrated in this Figure is comprised of a housing 172 adapted for use as a combustion engine, end plates 174 comprised of fluid cooling means 176, a shaft 178, ignition means 180. The center housing 182 separates the pair of rotors illustrated. As will be apparent to those skilled in the art, the device of this Figure may comprise one rotor, two rotors, three rotors, four rotors, etc. The device also is comprised of end plate 188.

Figure 26:
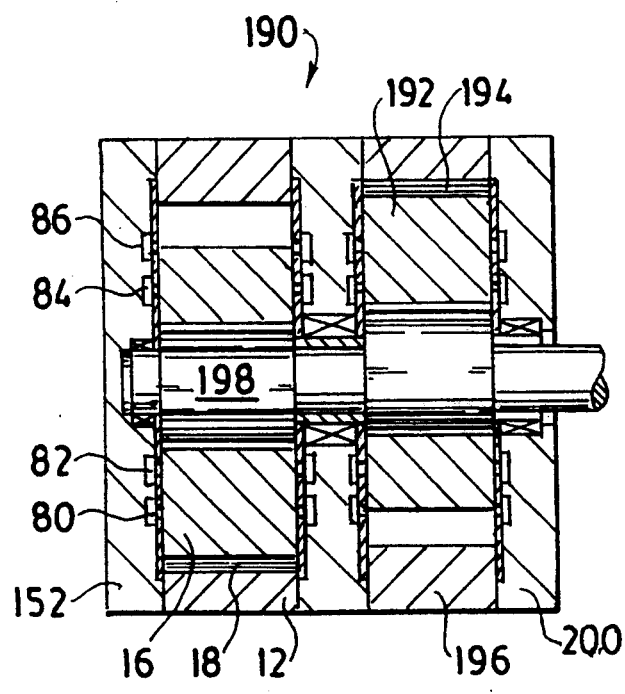
FIG. 26 is a cross-sectional view of a stacked rotor assembly.

FIG. 26 is a sectional view of a stacked rotor assembly 190 which is comprised of two substantially similar rotors 16 and 192 and end plate 200. In this embodiment, rotors 16 and 192 are substantially identical, and are housed within body 196. It will be apparent to those skilled in the art, however, that one may use rotors and/or housings with different geometries, and/or dimensions, and/or portings, and/or materials, and/or other features to achieve a variety of different effects. It will be apparent that more than two rotors may be stacked on the same shaft 198.

In one embodiment, not shown, a series of four rotors are used to compress natural gas. The first two stacked rotors are substantially identical and relatively large; they are 180 degrees out of phase with each other; and they are used to compress natural gas to an intermediate pressure level of from about 150 to about 200 p.s.i.g. The third stacked rotor, which comprises the second stage of the device, is substantially smaller than the first two and compresses the natural gas to a higher pressure of from about 800 to about 1,000 p.s.i.g. The last stacked, which is yet smaller, is the third stage of the device and compresses the natural gas to a pressure of from about 3,600 to about 4,500 p.s.i.g.

It will be apparent to those skilled in the art that, instead of stacking the first two rotors of the first stage, one could construct one rotor adapted to effect the same pressure increase. However, by using two identical stacked rotors, the centrifugal forces of the rotors can be counterbalanced, and improved fluid flow can be achieved.

Figure 27:
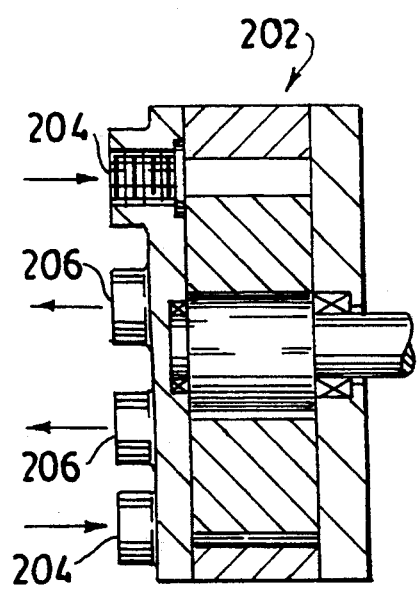
FIG. 27 is a cross-sectional view of a guided rotor pump and/or motor.

FIG. 27 is a sectional view of hydraulic pump/motor assembly 202 in which the inlet ports 204 and outlet ports 206 are configured and disposed so that ports 204 and 206 are never simultaneously in communication with the operating volume of the fluid. Furthermore, at least one of such ports 204 and 206 is always in communication with the working volume throughout the period during which the, working volume is changing. In the embodiment illustrated, a three-lobe pump is depicted which will contain three pairs of such ports.

Figure 28:
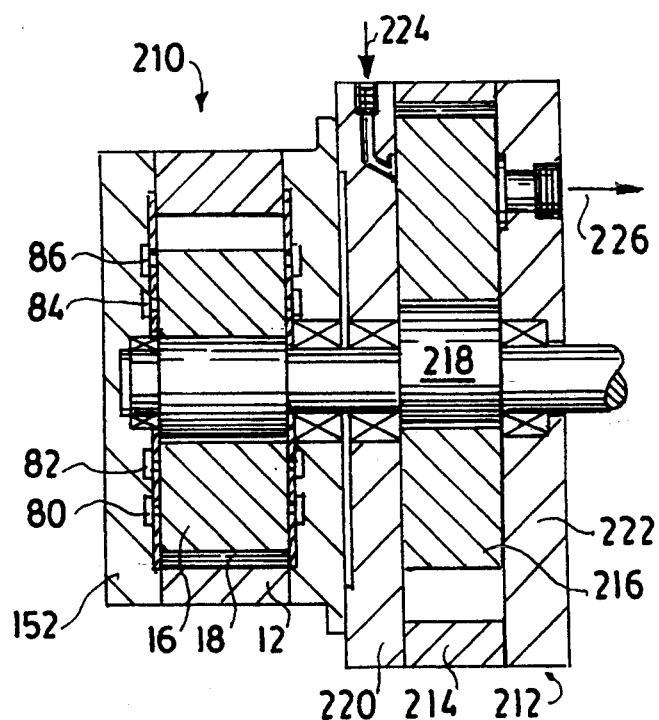
FIG. 28 is a cross-sectional view of a guided rotor mechanism arranged as a compression/expansion device.

FIG. 28 is a sectional view of a close coupled compressor/expander system 210 which contains a guided rotor compressor 10 which, in the preferred embodiment illustrated, is integrally connected to a guided rotor expansion device 212 comprised of expansion housing 214, rotor 216, shaft 218, intermediate housing 220, end housing 222, and three pairs of inlet ports 224 and discharge ports 226 (only one of which pairs is illustrated in the Figure). The expansion assembly 212 may utilize the high-pressure working fluid originally compressed by compressor assembly 10. Alternatively, or additionally, it may utilize a different high-pressure process stream.

In one embodiment, not shown, the compressor is comprised of two or more stacked and/or staged rotors. In another embodiment, not shown, the expansion device is comprised of two or more stacked and/or staged rotors.

Figure 30:
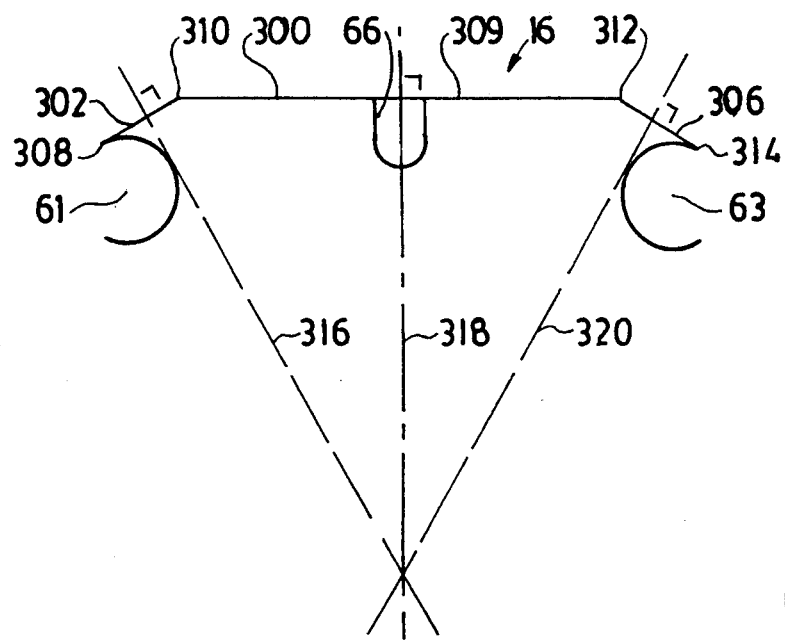
FIG. 30 is a partial sectional view of one preferred rotor used in the apparatus of this invention.

FIG. 30 is a partial sectional view of a preferred embodiment of rotor 16 from which irrelevant detail has been omitted for the sake of clarity. Referring to FIG. 30, it will be seen that rotor 16 is comprised of a multiplicity of sides such as, e.g., side 300. The rotor depicted in FIG. 1 will have four such identical sides 300 corresponding to three lobes of housing 12. By comparison, when housing 12 has two lobes, the rotor 16 will have three such identical sides 300.

Figure 31:
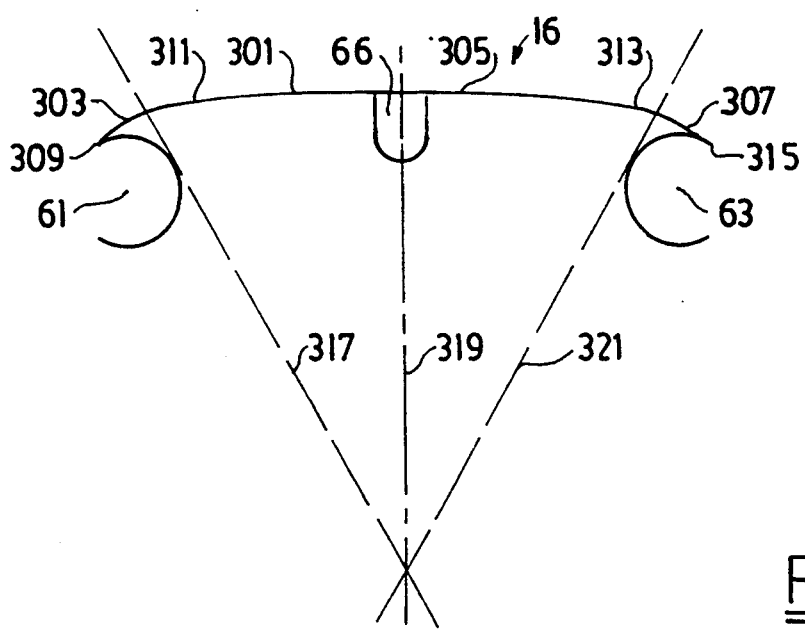
FIG. 31 is a partial sectional view of another preferred rotor used in the apparatus of the invention.

Referring to FIG. 1, for any given rotor 16, each of the sides 300 will have preferably the same dimensions and geometry. In FIGS. 30 and 31, only one of such sides 300 is shown, it being understood that the other sides of rotor 16 not shown are substantially identical.

Referring again to FIG. 30, it will be seen that side 300 has a discontinous shape, i.e., it is not formed of either only one linear side or only one continuous arcuate section with a constant radius. Thus, referring to FIG. 30, it will be seen that side 30 has a shape which is formed from at least two sections having different shapes.

If one section of a side is linear, and a second section of a side is arcuate, then the two sections have different shapes. If one section of a side is arcuate, and a second section of a side is also arcuate, the two arcuate sections will have different shapes when they haw different radii of curvature. If one section of a side is 2linear, and a second section of the side also is linear, they will have different shapes if a first centerline constructed perpendicular to the first linear section is not parallel to a second centerline constructed perpendicular to the second linear section.

Referring to FIG. 30, and in the preferred embodiment illustrated therein, it will be seen that side 300 has a composite shape formed of linear sections 302, 304, and 306. Section 302 is formed between points 308 and 310; section 304 is formed between points 310 and 312; and section 306 is formed between points 312 and 314.

Figure 30A:
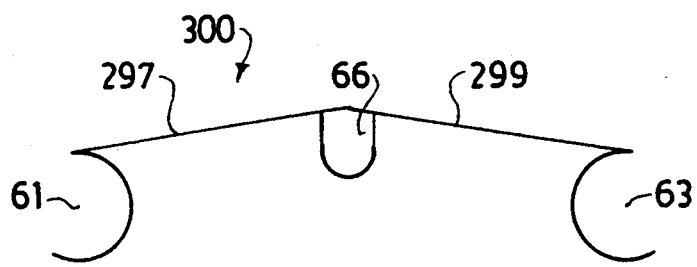

Although the preferred embodiment of FIG. 30 depicts a shape comprised of three separate linear poritons 302, 304, and 306, it will be understood that a shape comprised of two separate linear portions also may be used in rotor 16. Such a shape is depicted in FIG. 30A, in which linear sections 297 and 299 are illustrated.

Referring again to FIG. 30, it will be seen that centerlines 316, 318, and 320 may be constructed for sections 302, 304, and 306, respectively, by conventional geometrical means. As is readily known, these centerlines so constructed are normal to the plane of each respetive linear surface. Because none of these centerlines are parallel to each other, the linear sections 302, 304, and 306 each have different shapes.

The centerline of section 302, centerline 316, is neither coincident with nor parallel to either the centerline of section 304 (centerline 318) of the centerline of section 306 (centerline 320); and the same may be said for each of the centerlines of sections 304 and 306.

FIG. 31 is a partial sectional view of another preferred rotor 16, which uses a shape somewhat different than that depicted for side 300.

Referring to FIG. 31, it will be seen that side 301 is a composite shape comprising at least two separate arcuate 323 sections 303, 305, and 307. Section 3C, 3 is formed between points 309 and 311; section 305 is formed between points 311 and 313; and section 307 is formed between points 313 and 315. Inasmuch as the radius of curvature for each of arcuate sections 303 and 307 differs from the radius of curvature for section 305, each of sections 303 and 307 has a shape which differs from that of section 305.

Although the preferred embodiment of FIG. 31 depicts a shape comprised of three separate arcuate portions 303, 305, and 307, it will be understood that a shape comprised of two separate arcuate portions also may be used in rotor 16. It will also be apparent to those skilled in the art that a combination of arcuate and linear portions also may be used.

In the embodiment depicted in FIG. 31, the radius of section 303 is substantially equal to the radius of section 307 but differs from (is smaller than) the radius of section 305.

Referring again to FIG. 31, it will be seen that centerlines 317, 319, and 321 may be constructed for sections 303, 305, and 307, respectively, by conventional geometrical means. As is readily known, these centerlines so construced are normal to the tangent at the midpoint of each respective arcuate surface.

Figure 32:
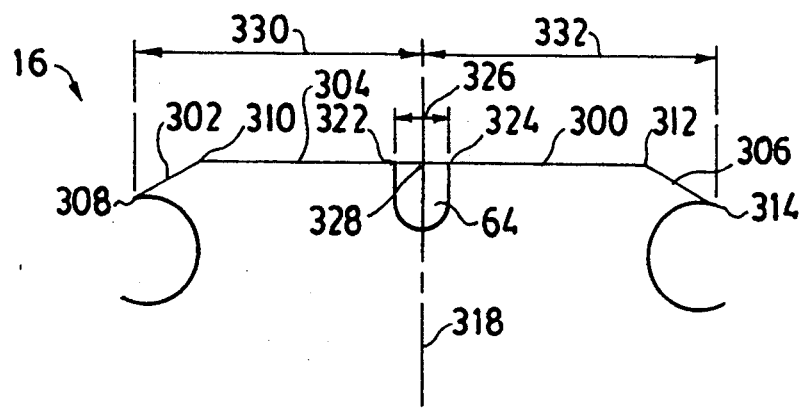
FIG. 32 is a partial sectional view of the rotor of FIG. 30, illustrating the recesses on the sides thereof.

FIG. 32 is a sectional view of a preferred rotor 16 from which irrelevant detail has been omitted for the sake of clarity in order to illustrate and discuss the shape and location of the openings in sides 300, such as recess 64. Although four such recesses are utilized in one of applicant's preferred rotors (see FIG. 5), it will be understood that the situation for each of the other recesses 66, 68, and 70 is identical to recess 64.

Referring to FIG. 32, it will be seen that recess 64 extends from point 322 to point 324 and, thus, has a width 326. A centerline 318 may be constructed across width 326 by conventional means. The distance 330 between centerline 318 and end 308 of side 300 is equal to the distance 332 between centerline 318 and end 314 of side 300; and recess 64 is symmetrical around centerline 318. Thus, it will be apparent that recess 64 (and comparable recesses 66, 68, and 70) are both equidistant from the ends of side 300 and symmetrical about their midpoint.

Figure 33:
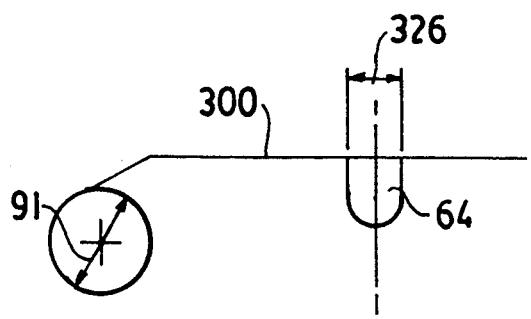
FIG. 33 is another partial sectional view of the rotor of FIG. 30.

FIG. 33 is a partial sectional view of side 300 from which irrelevant detail has been omitted. Referring to FIG. 33, it will be seen that width 326 of recess 64 is less than the diameter 91 of roller 18 (see FIG. 10).

Figure 34:
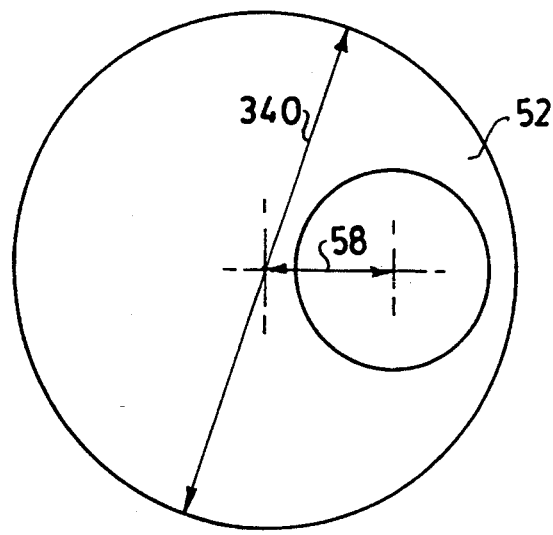
FIG. 34 is is a sectional view of the shaft used in the apparatus of FIG. 1.
Figure 35:
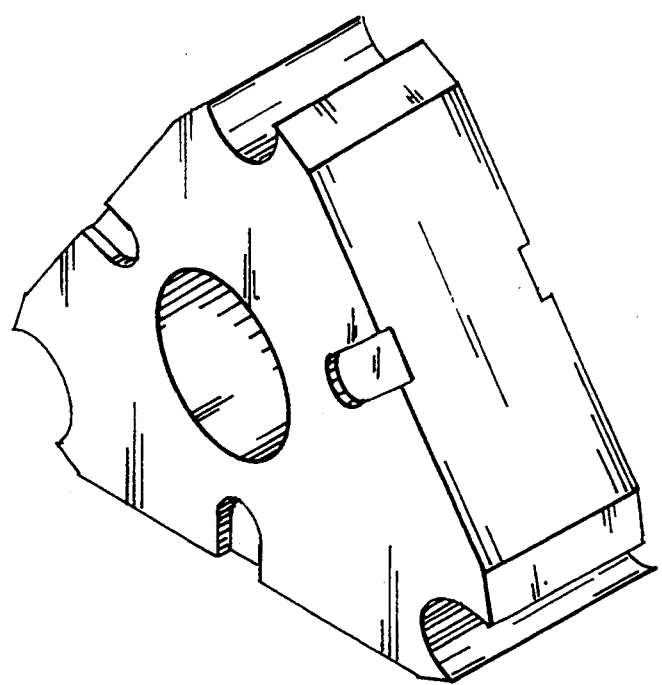
FIG. 35 is a perspective view of a triangular rotor which can be used in the apparatus of the invention.

FIG. 34 is a sectional view of shaft 52 (also see FIG. 4). Referring to FIG. 34, and in the preferred embodiment depicted therein, it will be seen that the eccentric 52 has a diameter 340 which is at least about 0.4 times as great as the height 342 times of rotor 16 (see FIG. 6).

In one preferred embodiment, the eccentricity 58 (see FIG. 34) is from about 0.05 inches to about 10 inches.

We claim:

1. A rotary device comprised of a housing comprising a curved inner surface with a profile equidistant from a trochoidal curve, an eccentric mounted on a shaft disposed within said housing, a first rotor mounted on said eccentric shaft which is comprised of a first side, a second side, and a third side, a first partial bore disposed at the intersection of said first side and said second side, a second partial bore disposed at the intersection of said second side and said third side, a third partial bore disposed at the intersection of said third side and said first side, a first solid roller disposed and rotatably mounted within said first partial bore, a second solid roller disposed and rotatably mounted within said second partial bore, and a third solid roller disposed and rotatably mounted within said third partial bore wherein:

(a) said rotor is comprised of a front face, a back face, said first side, said second side, and said third side, wherein:

1. a first opening is formed between and communicates between said front face and said first side,
   2. a second opening is formed between and communicates between said back face and said first side, wherein each of said first opening and said second opening is substantially equidistant and symmetrical between said first partial bore and said second partial bore,
   3. a third opening is formed between and communicates between said front face and said second side,
   4. a fourth opening is formed between and communicates between said back face and said second side, wherein each of said third opening and said fourth opening is substantially equidistant and symmetrical between said second partial bore and said third partial bore,
   5. a fifth opening is formed between and communicates between said front face and said third side, and
   6. a sixth opening is formed between and communicates between said back face and said third side, wherein each of said fifth opening and said sixth opening is substantially equidistant and symmetrical between said third partial bore and said first partial bore;

(b) each of said first partial bore, said second partial bore, and said third partial bore is comprised of a centerpoint which, as said rotary device rotates, moves along said trochoidal curve;

(c) each of said first opening, said second opening, said third opening, said fourth opening, said fifth opening, and said sixth opening has a substantially U-shaped cross-sectional shape defined by a first linear side, a second linear side, and an arcuate section joining said first linear side and said second linear side, wherein:
1. said first linear side and said second linear side are disposed with respect to each other at an angle of less than ninety degrees, and
2. said substantially U-shaped cross sectional shape has a depth which is at least equal to its width;

(d) the diameter of said first solid roller is equal to the diameter of said second solid roller, and the diameter of said second solid roller is equal to the diameter of said third solid roller;

(e) the widths of each of said first opening, said second opening, said third opening, said fourth opening, said fifth opening, and said sixth opening are substantially the same, and the width of each of said openings is less than the diameter of said first solid roller; and (f) each of said first side, said second side, and said third side has substantially the same geometry and size and is a composite shape comprised of a first section and a second section, wherein said first section has a shape which is different from said second section.

2. A rotary device comprised of a housing comprising a curved inner surface with a profile equidistant from a trochoidal curve, an eccentric mounted on a shaft disposed within said housing, a first rotor mounted on said eccentric shaft which is comprised of a first side, a second side, and a third side, a first partial bore disposed at the intersection of said first side and said second side, a second partial bore disposed at the intersection of said second side and said third side, a third partial bore disposed at the intersection of said third side and said first side, a first solid roller disposed and rotatably mounted within said first partial bore, a second solid roller disposed and rotatably mounted within said second partial bore, and a third solid roller disposed and rotatably mounted within said third partial bore wherein:

(a) said rotor is comprised of a front face, a back face, said first side, said second side, and said third side, wherein:
1. a first opening is formed between and communicates between said front face and said first side,
2. a second opening is formed between and communicates between said back face and said first side, wherein each of said first opening and said second opening is substantially equidistant and symmetrical between said first partial bore and said second partial bore,
3. a third opening is formed between and communicates between said front face and said second side,
4. a fourth opening is formed between and communicates between said back face and said second side, wherein each of said third opening and said fourth opening is substantially equidistant and symmetrical between said second partial bore and said third partial bore,
5. a fifth opening is formed between and communicates between said front face and said third side, and
6. a sixth opening is formed between and communicates between said back face and said third side, wherein each of said fifth opening and said sixth opening is substantially and equidistant and symmetrical metrical between said third partial bore and said first partial bore;

(b) each of said first partial bore, said second partial bore, and said third partial bore is comprised of a centerpoint which, as said rotary device rotates, moves along said trochoidal curve;

(c) the diameter of said first solid roller is equal to the diameter of said second solid roller, and the diameter of said second solid roller is equal to the diameter of said third solid roller;

(d) the widths of each of said first opening, said second opening, said third opening, said fourth opening, said fifth opening, and said sixth opening are substantially the same, and the width of each of said openings is less than the diameter of said first solid roller; and (e) each of said first side, said second side, and said third side has substantially the same geometry and size and is a composite shape comprised of a first section and a second section, wherein said first section has a shape which is different from said second section.

3. A rotary device comprised of a housing comprising a curved inner surface with a profile equidistant from a trochoidal curve, an eccentric mounted on a shaft disposed within said housing, a first rotor mounted on said eccentric shaft which is comprised of a first side, a second side, a third side, and a fourth side, a first partial bore disposed at the intersection of said first side and said second side, a second partial bore disposed at the intersection of said second side and said third side, a third partial bore disposed at the intersection of said third side and said fourth side, and a fourth partial bore disposed at the intersection of said fourth side and said first side, a first solid roller disposed and rotatably mounted within said first partial bore, a second solid roller disposed and rotatably mounted within said second partial bore, and a third solid roller disposed and rotatably mounted within said third partial bore, and a fourth solid roller disposed and rotatably mounted within said fourth partial bore, wherein:

(a) said rotor is comprised of a front face, a back face, said first side, said second side, said third side, and said fourth side, wherein:
1. a first opening is formed between and communicates between said front face and said first side,
2. a second opening is formed between and communicates between said back face and said first side, wherein each of said first opening and said second opening is substantially equidistant and symmetrical between said first partial bore and said second partial bore,
3. a third opening is formed between and communicates between said front face and said second side,
4. a fourth opening is formed between and communicates between said back face and said second side, wherein each of said third opening and said fourth opening is substantially equidistant and symmetrical between said second partial bore and said third partial bore, 5. a fifth opening is formed between and communicates between said front face and said third side,
6. a sixth opening is formed between and communicates between said back face and said third side, wherein each of said fifth opening and said sixth opening is substantially equidistant and symmetrical between said third partial bore and said fourth partial bore,
7. a seventh opening is formed between and communicates between said front face and said fourth side, and
8. a eighth opening is formed between and communicates between said back face and said fourth side, wherein each of said seventh opening and said eighth opening is substantially equidistant and symmetrical between said fourth partial bore and said first partial bore;

(b) each of said first partial bore, said second partial bore, said third partial bore, and said fourth partial bore is comprised of a centerpoint which, as said rotary device rotates, moves along said trochoidal curve;

(c) the diameter of said first solid roller is equal to the diameter of said second solid roller, the diameter of said second solid roller is equal to the diameter of said third solid roller, and the diameter of said third solid roller is equal to the diameter of said fourth solid roller;

(d) the widths of each of said first opening, said second opening, said third opening, said fourth opening, said fifth opening, said sixth opening, said seventh opening, and said eighth opening are substantially the same, and the width of each of said openings is less than the diameter of said first solid roller; and (e) each of said first side, said second side, said third side, and said fourth side has substantially the same geometry and size and is a composite shape comprised of a first section and a second section, wherein said first section has a shape which is different from said second section.

4. The rotary device as recited in claim 3, wherein said trochoidal curve is a hypotrochoidal curve.

5. The rotary device as recited in claim 3, wherein said trochoidal curve is an epitrochoidal curve.

6. The rotary device as recited in claim 5, wherein said housing is an integral structure which consists essentially of steel.

7. The rotary device as recited in claim 5, wherein said eccentric is integrally connected to said shaft.

8. The rotary device as recited in claim 5, wherein said shaft has a substantially cylindrical shape.

9. The rotary device as recited in claim 5, wherein said rotor is comprised of a body and a bore centrally disposed within said body.

10. The rotary device as recited in claim 9, wherein said device is comprised of a bearing disposed between said eccentric and said bore.

11. The rotary device as recited in claim 5, wherein each of said first roller, said second roller, said third roller, and said fourth roller consists essentially of a fiber-reinforced polymeric material.

12. The rotary device as recited in claim 11, wherein said fiber is a nylon fiber.

13. The rotary device as recited in claim 12, wherein said nylon is derived from p-phenyhlenediamine and terephthaloyl chloride.

14. The rotary device as recited in claim 5, wherein said rotor has a substantially rectilinear shape.

15. The rotary device as recited in claim 5, wherein at least one of said first solid roller, said second solid roller, and said third roller, and said fourth solid roller is comprised of an end with concentric grooves therein.

16. The rotary device as recited in claim 5, wherein at least one of said first solid roller, said second solid roller, said third solid roller, and said fourth solid roller is comprised of an end with spiral grooves therein.

17. The rotary device as recited in claim 5, wherein said device is operatively connected to an electric motor.

18. The rotary device as recited in claim 5, wherein said device is operatively connected to a combustion engine.

* * * * *